J. T. MOORE & W. J. FLEMING.
DRIVEN WHEEL.
APPLICATION FILED AUG. 11, 1908.

906,445.

Patented Dec. 8, 1908.

2 SHEETS—SHEET 1.

WITNESSES
L. H. Schmidt
C. E. Trainor

INVENTORS
JOHN T. MOORE,
WILLIAM J. FLEMING,
BY Munn & Co.
ATTORNEYS

J. T. MOORE & W. J. FLEMING.
DRIVEN WHEEL.
APPLICATION FILED AUG. 11, 1908.
906,445.
Patented Dec. 8, 1908.
2 SHEETS—SHEET 2.
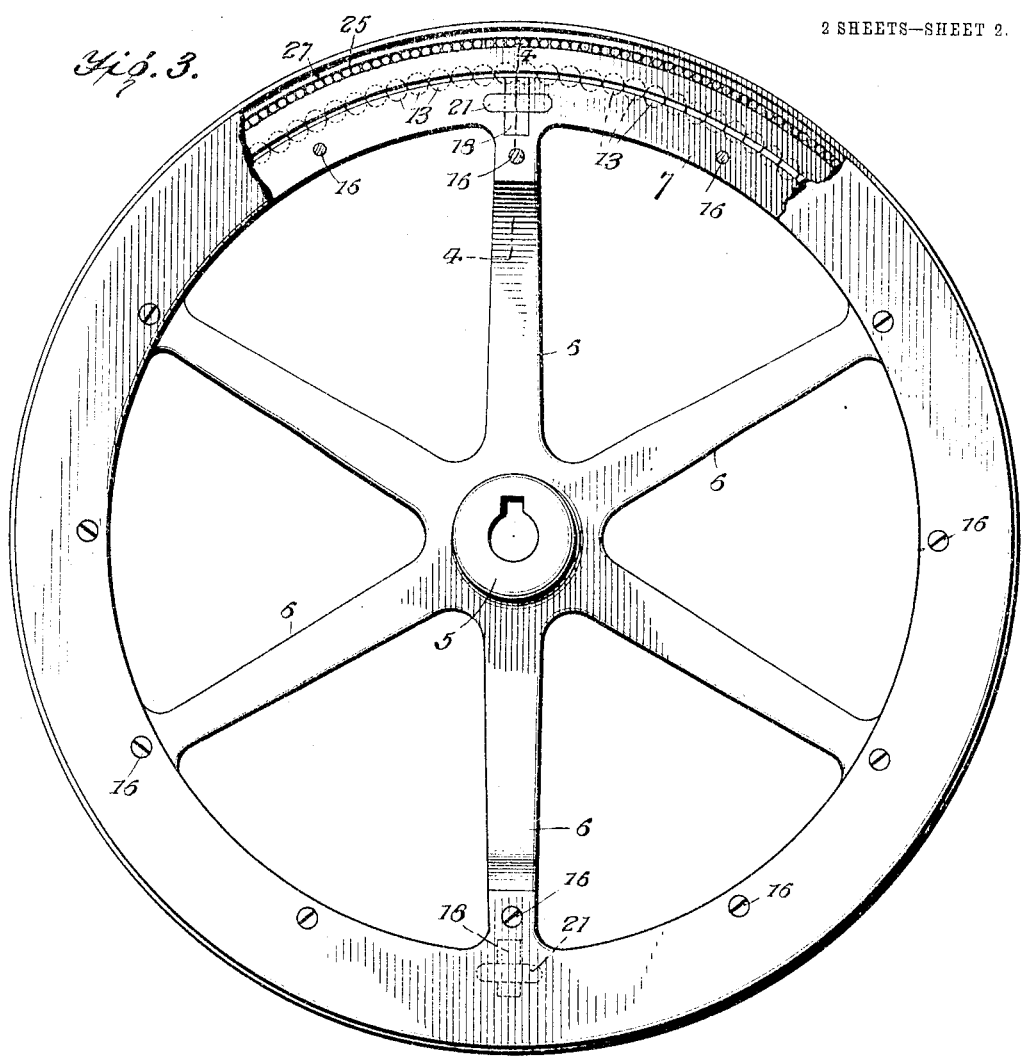
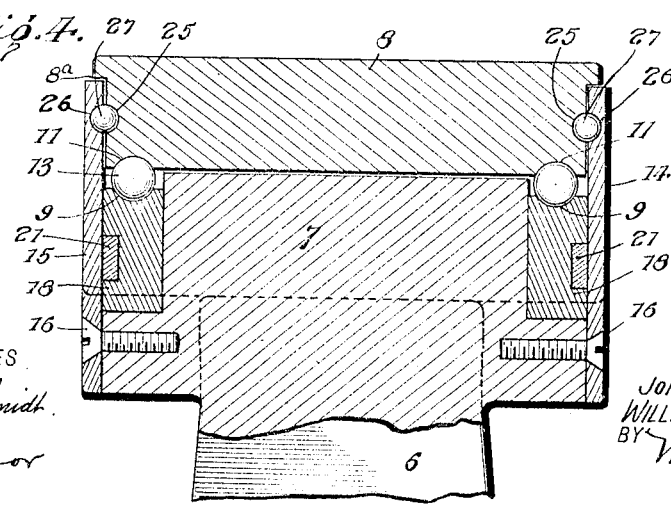
WITNESSES
L. H. Schmidt
C. E. Trainor
INVENTORS
JOHN T. MOORE,
WILLIAM J. FLEMING,
BY Munn & Co.
ATTORNEYS

UNITED STATES PATENT OFFICE.

JOHN T. MOORE AND WILLIAM J. FLEMING, OF EVANSVILLE, INDIANA.

DRIVEN WHEEL.

No. 906,445.  Specification of Letters Patent.  Patented Dec. 8, 1908.

Application filed August 11, 1908. Serial No. 447,970.

To all whom it may concern:

Be it known that we, JOHN T. MOORE and WILLIAM J. FLEMING, citizens of the United States, and residents of Evansville, in the county of Vanderburg and State of Indiana, have invented certain new and useful Improvements in Driven Wheels, of which the following is a specification.

Our invention is an improvement in driven wheels, and consists in certain novel constructions and combinations of parts hereinafter described and claimed.

The object of the invention is to provide a driven wheel, wherein the momentum of the driving wheel will, at all times, when in action, predominate over the momentum of the driven wheel, and the improved wheel is especially adapted for use as the driven wheel of a band saw or band knife machine, but may be used in any loose pulley where a minimum momentum is desired.

Figure 1:
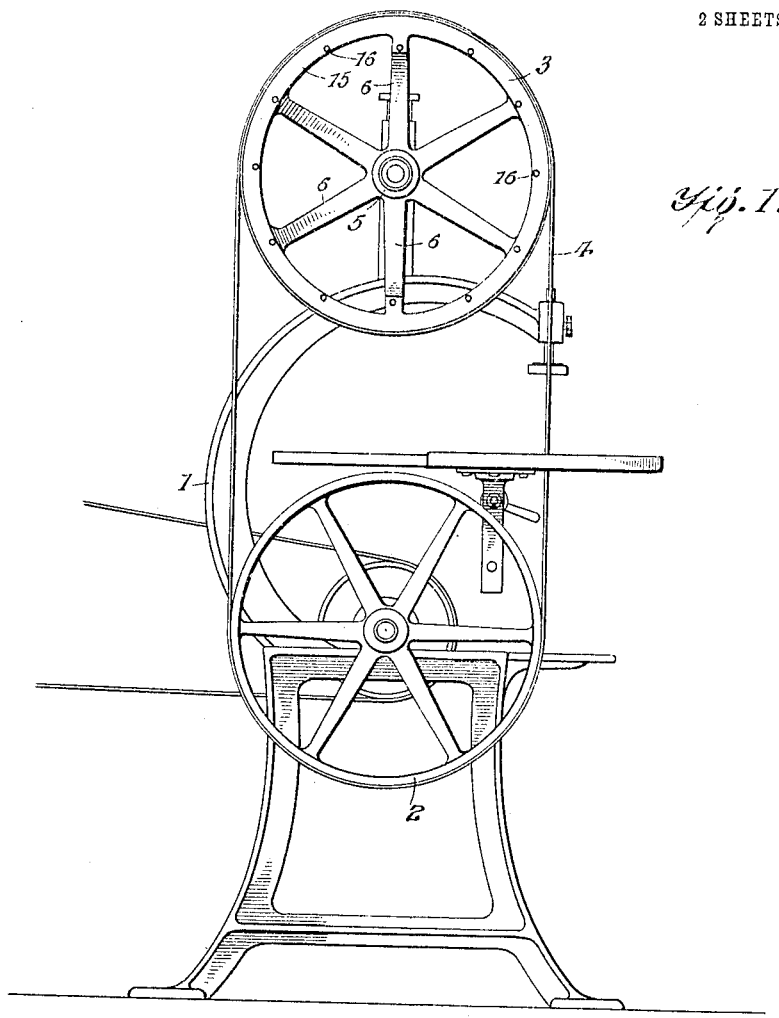
Figure 2:
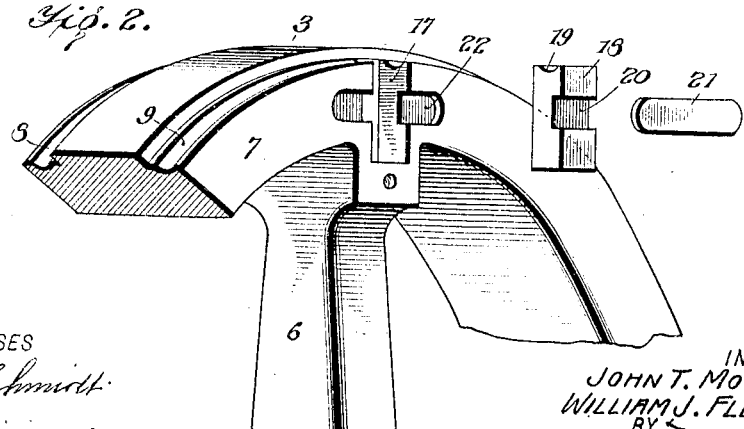

Referring to the drawings forming a part hereof, Figure 1 is a side view of a band sawing machine provided with our improved wheel. Fig. 2 is a detail perspective view of a portion of the rim of the wheel. Fig. 3 is a side view of the wheel, parts thereof being broken away, and Fig. 4 is a section on the line 4—4 of Fig. 3.

The present embodiment of the invention is shown applied to a band sawing machine 1 of usual construction, wherein the driving wheel 2 and the driven wheel 3 are connected by a band saw 4, the driven wheel 3 receiving its motion from the driving wheel 2, by means of the band saw 4.

The improved wheel as shown in Figs. 2, 3, and 4, comprises a hub 5, connected by spokes 6, with a rim 7, which rim is provided on its peripheral surface with a plurality of annular grooves 9 and 9, the grooves being arranged near the side edges of the peripheral surface as shown in Fig. 2. The tire 8 is annular in form, and is provided on its inner surface with annular grooves 11, coöperating with the grooves 9, 9, to form ball races, in which are received a plurality of balls 13. Annular side plates 14, 15 are provided which are secured to the rim by screws 16, the side plates stopping short of the peripheral surface of the tire, as shown in Fig. 4, and the tire is shouldered as at 8ª forming recesses for receiving the peripheral edges of the side plates. Each side surface of the tire is provided with an annular groove 25, which coöperates with an annular groove 26 on the adjacent side plate, to form a ball race, in which is received a plurality of balls 27. By removing the block 20 and the plate 21, the balls 13 may be inserted or removed from the ball race, and when the block and plate are replaced, and the side plates 15 fastened to the rim, the balls are retained securely in their race.

In band sawing machines, should the momentum of the driven wheel for any reason predominate over the momentum of the driving wheel, the band saw or knife will buckle or kink and the difference in momentum may be brought about by any means causing an irregular running of the driving wheel.

It will be evident from the description, that the weight of a driven wheel constructed in accordance with our improvement may be greatly lessened, since the actual weight to be propelled by the driving wheel is the weight of the tire. Side motion of the driven wheel is also eliminated, the said side motion being objectionable since it causes irregular wear of the shaft or boxing. Since the driven wheel follows so closely the motion of the driving wheel, the saw or knife blade will at all times be rigid as it passes through the material to be cut. The danger to the operator is also greatly lessened since there is less liability of bursting of the driven wheel, nor are there spokes to catch the blade when broken, and since there is a minimum of momentum of the tire, the broken blade or broken tire would not be thrown with any great force. The strain on the saw or knife blade is also greatly reduced, since all irregular strain is eliminated, and since side motion is eliminated, the blade will stretch evenly thus lengthening the life of the same.

We claim:

1. A driven wheel comprising a rim provided on its peripheral and side surfaces with annular grooves, and a tire provided on its inner surface with annular grooves, coöperating with the peripheral grooves of the rim to form ball races, balls in the races, said rim being provided with recesses extending to the peripheral surface thereof, and transversely of the grooves, blocks fitting within the recesses and provided on their outer surfaces with a groove registering with the adjacent annular groove of the rim, and annular side-plates secured to the rim and engaging the side surface of the tire, said plates having annular grooves coöperating with the grooves on the side surfaces of the rim to form ball races, and balls in the races.

2. A driven wheel comprising a hub and a connected rim, a tire on the rim, the adjacent faces of the tire and rim being grooved to provide ball races, balls within the races, said rim being provided with recesses extending to the peripheral surface thereof, and communicating with the grooves, blocks fitting within the recesses, and annular side plates secured to the rim and engaging the side surfaces of the tire.

JOHN T. MOORE.
WILLIAM J. FLEMING.

Witnesses:
EDWARD C. JARVIS,
JAMES G. SPALDING.